(12) United States Patent
Nohara

(10) Patent No.: US 7,773,830 B2
(45) Date of Patent: Aug. 10, 2010

(54) IMAGE PROCESSING APPARATUS AND METHOD

(75) Inventor: Gakushi Nohara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1211 days.

(21) Appl. No.: 11/276,207

(22) Filed: Feb. 17, 2006

(65) Prior Publication Data

US 2006/0181550 A1   Aug. 17, 2006

(30) Foreign Application Priority Data

Feb. 17, 2005   (JP) .............................. 2005-040896

(51) Int. Cl.
    *G09G 5/00*   (2006.01)
(52) U.S. Cl. ..................... 382/296; 345/619; 345/648; 382/298; 382/300
(58) Field of Classification Search ................ 382/296, 382/298, 330; 345/619, 648
    See application file for complete search history.

(56) References Cited

U.S. PATENT DOCUMENTS 6,339,434 B1 * 1/2002 West et al. .................. 345/667
7,065,261 B1 * 6/2006 Horie ......................... 382/289

FOREIGN PATENT DOCUMENTS

JP          07-32004      * 12/1995
JP          7-320047        12/1995

* cited by examiner

*Primary Examiner*—Bhavesh M Mehta
*Assistant Examiner*—Stephen R Koziol
(74) *Attorney, Agent, or Firm*—Fitzpatrick, Cella, Harper & Scinto

(57) ABSTRACT

Disclosed is an image processing apparatus in which, when processing speed is deemed important, as when performing frame-advance playback or a scrolling display, a low-resolution display is presented using an image reduced to a size smaller than the display size. When frame-advance playback or scrolling is halted, a high-resolution image is displayed by presenting a display using an image reduced to the size of the display. As a result, the apparatus is extremely user friendly.

8 Claims, 8 Drawing Sheets

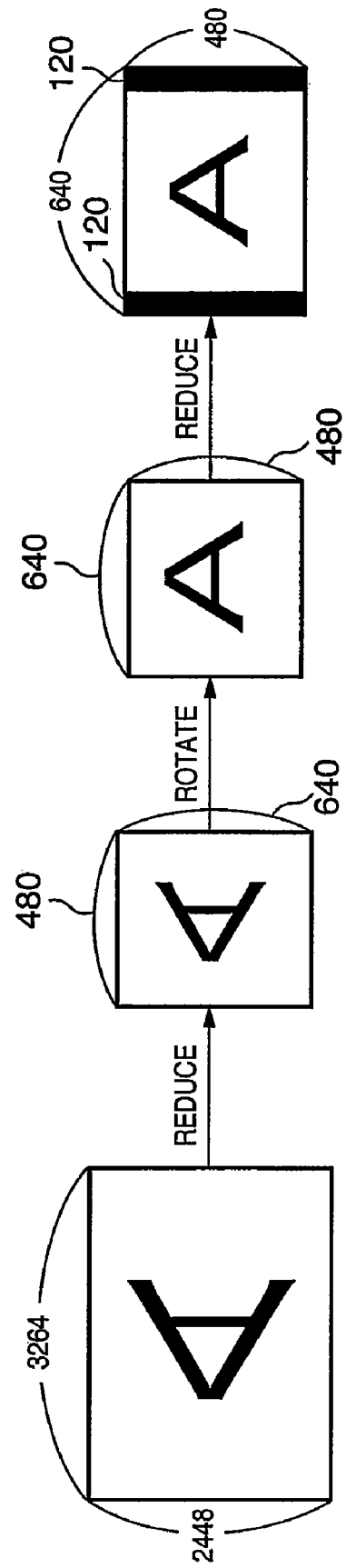

PROCESSING TO ROTATE IMAGE DATA OF SIZE
IDENTICAL WITH SIZE OF DISPLAY SCREEN

IMAGE PROCESSING APPARATUS AND METHOD

FIELD OF THE INVENTION

This invention relates to an image processing apparatus and method. More particularly, the invention relates to an image processing apparatus and method whereby it is possible to execute easy-to-use display processing.

BACKGROUND OF THE INVENTION

An image processing apparatus such as an electronic camera that records and reproduces still and moving pictures using a semiconductor memory card as a recording medium is available on the market. Photography using a camera includes photography with the camera held in a vertical orientation (portrait photography) and photography with the camera held in a horizontal orientation (landscape photography). A group of images shot by a camera usually includes images having different orientations. There are also electronic cameras having a function such that when such a group of images is displayed, images that were shot so have the portrait orientation are rotated automatically to make their orientation agree with that of images that were shot in the landscape orientation.

A function for playing back a shot image after shooting is beneficial to the user of the electronic camera. Electronic cameras having a function for rotating a shot still image automatically by sensing the orientation of the camera held by the user are also already on the market.

It is known that if an image is rotated and displayed, more time is required to read image data from the memory card in comparison with a case where the display is presented without rotation. For this reason, as disclosed in the specification of Japanese Patent Application Laid-Open No. 07-320047, a technique has been proposed whereby rotation processing is executed after image data to be rotated has been reduced in size, thereby shortening data read-out time and reducing processing time required for rotating and displaying images.

FIG. 8 schematically illustrates this technique for shortening the time needed to rotate and display an image. First, original image data is reduced to make it conform to the display size (X pixels vertically and Y pixels horizontally) and then the image of reduced size is subjected to rotation processing.

Generally speaking, rotation processing is implemented by reading out data from noncontiguous addresses. It is known that for this reason, rotating and displaying an image takes approximately four times the processing time as compared with a case where an image is displayed without rotating it.

In order to deal with this, an image playback apparatus described in the specification of Japanese Patent Application Laid-Open No. 07-320047 contemplates shortening processing time by executing rotation processing after the still image to be rotated is reduced in size. However, since rotation processing usually is executed after the image has been reduced to a fixed size, a problem which arises is that successive changeover (frame advance) of images to be displayed cannot be performed smoothly.

Furthermore, a fixed period of time is required for rotation processing, as mentioned above, also with regard to processing during scrolling of part of the area of an image after the enlargement thereof. Consequently, reduction processing to a fixed size and rotation processing as in the prior art take time and smooth scrolling cannot be carried out.

SUMMARY OF THE INVENTION

Accordingly, an object of the present invention is to provide an image processing apparatus and method capable of providing a user with excellent ease of use.

According to an aspect of the invention, there is provided an image processing apparatus for generating display image data having a predetermined size from image data, comprising: reducing means for generating reduced-size image data, the size of which is smaller than the predetermined size, from the image data; rotating means for applying rotation processing to the reduced-size image to generate a rotated image; and enlarging means for outputting, as the display image data, a result obtained by enlarging the rotated image to the predetermined size.

According to an aspect of the invention, there is provided an image processing apparatus for generating display image data having a predetermined size from image data, comprising: detecting means for detecting an instruction to change over the image data; reducing means for generating a reduced-size image of the image data; rotating means for generating a rotated image obtained by rotating the reduced-size image; enlarging means for enlarging the rotated image to the predetermined size; and control means which, if the instruction to change over the image data has been detected, causes a reduced-size image having a size smaller than the predetermined size to be generated by the reducing means, and if the instruction to change over the image data has not been detected, causes a reduced-size image having the predetermined size to be generated by the reducing means and causes an output from the enlarging means to be delivered as the display image data.

According to an aspect of the invention, there is provided an image processing apparatus comprising: detecting means for detecting input of a move instruction; clipping means for clipping a region image having a predetermined size from clipping position, which conforms to the input of the move instruction, in the image data; and image processing means for generating display image data having the predetermined size from the region image; wherein if the input of the move instruction has been detected and the clipping position is capable of being moved in a direction that conforms to the move instruction, the image processing means generates display image data having a resolution lower than that in a case where input of the move instruction has been detected and the clipping position is incapable of being changed in the direction that conforms to the move instruction.

According to an aspect of the invention, there is provided an image processing method for generating display image data having a predetermined size from image data, comprising: a reducing step of generating reduced-size image data, the size of which is smaller than the predetermined size, from the image data; a rotating step of applying rotation processing to the reduced-size image to generate a rotated image; and an enlarging step of outputting, as the display image data, a result obtained by enlarging the rotated image to the predetermined size.

According to an aspect of the invention, there is provided an image processing method for generating display image data having a predetermined size from image data, comprising: a detecting step of detecting an instruction to change over the image data; a reducing step of generating a reduced-size image of the image data; a rotating step of generating a rotated image obtained by rotating the reduced-size image; an enlarging step of enlarging the rotated image to the predetermined size; and a control step of causing a reduced-size image having a size smaller than the predetermined size to be generated by the reducing step if the instruction to change over the image data has been detected, and causing a reduced-size image having the predetermined size to be generated by the reducing step and causing an output from the enlarging step to be delivered as the display image data if the instruction to change over the image data has not been detected.

According to an aspect of the invention, there is provided an image processing method comprising: a detecting step of detecting input of a move instruction; a clipping step of clipping a region image having a predetermined size from clipping position, which conforms to the input of the move instruction, in the image data; and an image processing step of generating display image data having the predetermined size from the region image; wherein if the input of the move instruction has been detected and the clipping position is capable of being moved in a direction that conforms to the move instruction, the image processing step generates display image data having a resolution lower than that in a case where input of the move instruction has been detected and the clipping position is incapable of being changed in the direction that conforms to the move instruction.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3D are diagrams illustrating the relationship between image processing at stopping of image frame-advance playback and display on a display unit in the image sensing apparatus according to the first embodiment;

DETAILED DESCRIPTION OF THE PREFERRED EMBODIMENTS

Preferred embodiments of the present invention will now be described in detail with reference to the accompanying drawings.

First Embodiment

Figure 1:
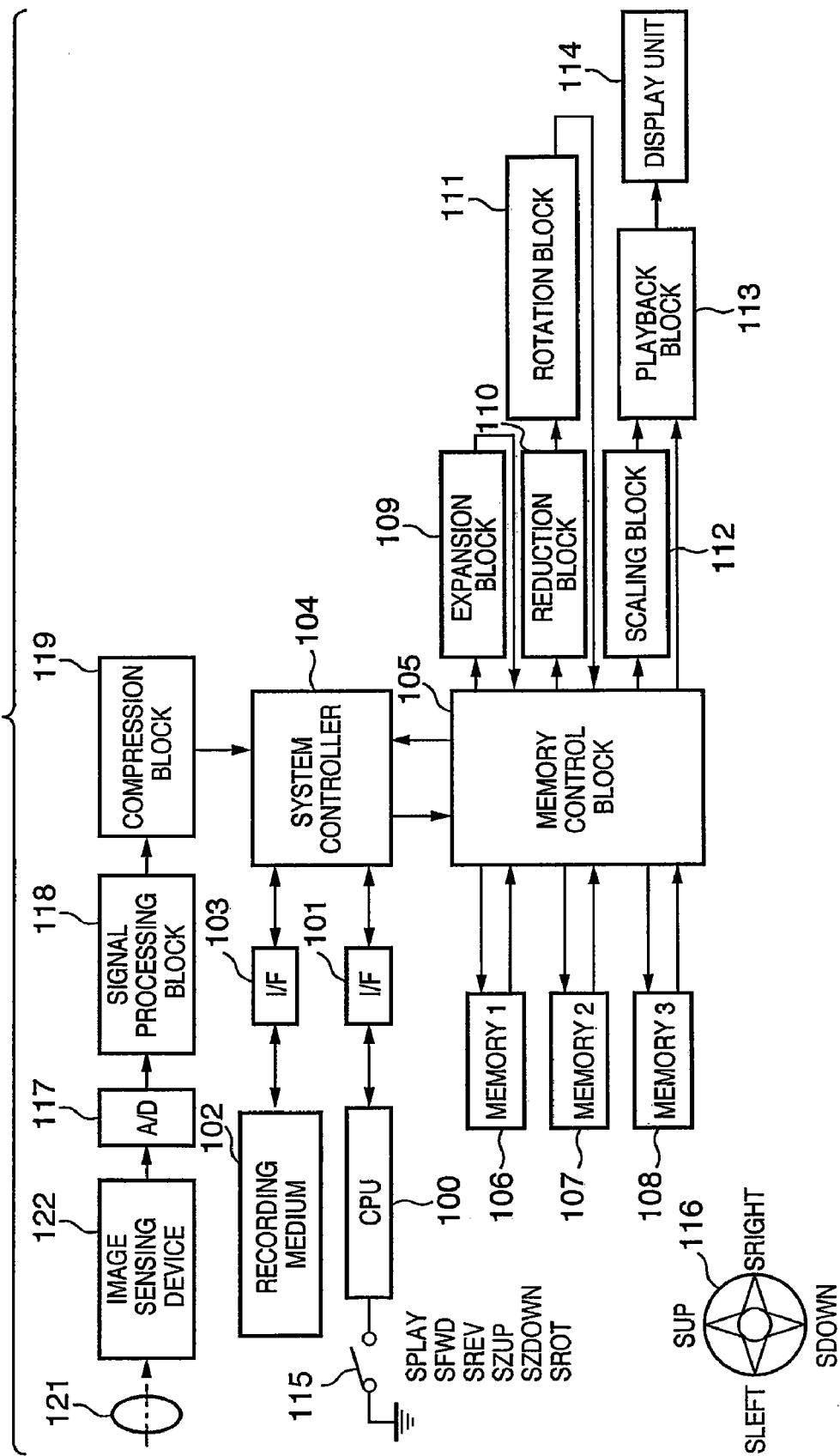
FIG. 1 is a block diagram illustrating an example of the structure of an image sensing apparatus according to a first embodiment of the present invention.

FIG. 1 is a block diagram illustrating an example of the structure of an image sensing apparatus embodying an image processing apparatus according to the present invention. As shown in FIG. 1, the apparatus includes a CPU (Central Processing Unit) 100, an interface (I/F) circuit 101 for interfacing the CPU 100, a recording medium 102 such as a memory card, and an interface (I/F) circuit 103 for interfacing the recording medium 102.

Further, a system controller 104 controls the image sensing apparatus in accordance with control exercised by the CPU 100. A memory control block 105 transfers, by DMA, the output of a compression block 119 or the output of the recording medium 102 to a first memory 106, the output of an expansion block 109 to a second memory 107 and the output of a rotation block 111 to a third memory 108.

The first memory 106 stores data after the compression thereof or data that has been read out of the recording medium 102, the second memory 107 stores data after the expansion thereof, and the third memory 108 stores data after the rotation thereof.

The expansion block 109 expands image data that has been compressed by the JPEG (Joint Photographic Experts Group) scheme, which is a scheme for compressing still image data. A reduction block 110 reduces image size by subjecting pixels to downsampling processing and interpolation processing, etc. The rotation block 111 subjects pixel data to processing for rotating the data in units of 90°.

A scaling block 112 executes processing for enlarging and reducing images. For example, the scaling block 112 enlarges a reduced-size image to the size of the screen display by interpolation processing or the like. The scaling block 112 performs scaling independently of the aspect ratio. A playback block 113 converts image data to a form displayable on a display unit 114. The latter is, e.g., a liquid crystal monitor, and it is assumed that the number of pixels that can be displayed is less than the number of pixels of an image sensing device 122.

The image sensing device 122 is a CCD sensor or CMOS sensor, etc.

The apparatus further includes an imaging lens 121; and A/D converter 117 for converting an analog signal, which is output by the image sensing device 122, to a digital signal; a signal processing block 118 for applying signal processing such as developing processing to raw data that has undergone the A/D conversion; and a compression block 119 for subjecting the output data of the signal processing block 118 to compressive encoding in accordance with a prescribed compression scheme (assumed to be the JPEG scheme here).

Various switches 115 connected to the CPU 100 will be described next. The user of the image sensing apparatus applies instructions to the image sensing apparatus by operating the switches 115, and the CPU 100 senses such switch operation and executes the corresponding processing. The control program executed by the CPU 100 has been stored in a non-volatile memory, which is not shown.

A switch SPLAY instructs the apparatus to play back an image. When this switch is closed, an image that has been recorded on the recording medium 102 is read out, expanded by the expansion block 109 and displayed on the display unit 114. A switch SFWD advances by one the image to be played back, and a switch SREV moves back by one the image to be played back. A switch SZUP instructs that the image to be played back is to be enlarged in size, and a switch SZDOWN instructs that the image to be played back is to be reduced in size. A switch SROT instructs rotation of the image to be played back. Whenever the switch SROT is closed, the playback image is rotated by 90° using the rotation block 111.

Switches SUP, SDOWN, SLEFT and SRIGHT correspond to the up, down, left and right parts, respectively, of a crosshair key 116. In this embodiment, the input from the crosshair key 116 is capable of being received in a state in which a playback image is being displayed in enlarged size. The switch SUP instructs that a displayed image of enlarged size is to be scrolled upward. Similarly, the switches SDOWN, SRIGHT and SLEFT instruct that the displayed image of enlarged size is to be scrolled downward, rightward and leftward, respectively.

FIGS. 2A to 2D are diagrams illustrating the relationship between image processing during image frame-advance playback processing and display on the display unit 114 in the image sensing apparatus according to this embodiment. As will be described later, in this embodiment it is assumed that a state in which the switch SFWD or SREV is being depressed continuously (a state in which an instruction to change over the image is being input) is a state in which image frame-advance playback is in progress. Further, a state in which depression of these switches is discontinued (a state in which there is no input of an instruction to change over an image) is assumed to be when image frame-advance playback is stopped.

Figures 2A, 2B, 2C, 2D:
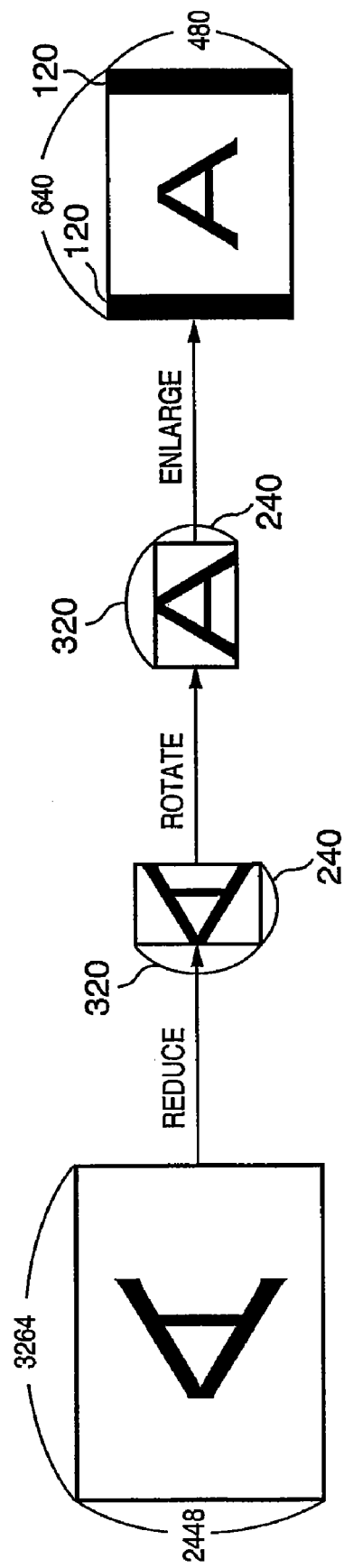
FIGS. 2A to 2D are diagrams illustrating the relationship between image processing during image frame-advance playback processing and display on a display unit in the image sensing apparatus according to the first embodiment.

FIG. 2A illustrates image data that has been stored in the first memory 106. (In this embodiment, image data prior to rotation stored in the first memory 106 shall be referred to as "original image data".) FIG. 2B illustrates the image data after it has been subjected to size-reduction processing to a size smaller than that of the display screen. FIG. 2C illustrates the image data, which is stored in the third memory 108, following the rotation of the image of FIG. 2B. FIG. 2D illustrates the image data, which is displayed on the display unit 114, after the reduced-size image of FIG. 2C has been enlarged to the display size. As shown in FIG. 2D, black data is displayed in the background of the display image data that prevails after the enlargement processing. It should be noted that the numbers of pixels vertically and horizontally in each state are indicated in each of the drawings.

FIGS. 3A to 3D are diagrams illustrating the relationship between image processing at stopping of image frame-advance playback and display on the display unit 114 in the image sensing apparatus of this embodiment. FIG. 3A illustrates the original image data that has been stored in the first memory 106. FIG. 3B illustrates the image data after it has been subjected to size-reduction processing to a size smaller than that of the display screen. FIG. 3C illustrates the image data, which is stored in the third memory 108, following the rotation of the image of FIG. 3B. FIG. 3D illustrates the image data displayed on the display unit 114. Since the image data for display is generated by applying a size reduction in the horizontal direction of the reduced-size image after the rotation thereof, black data 120 is displayed in the background of the display image data, as illustrated in FIG. 3D. It should be noted that the numbers of pixels vertically and horizontally in each state are indicated in each of the drawings.

Figure 4:
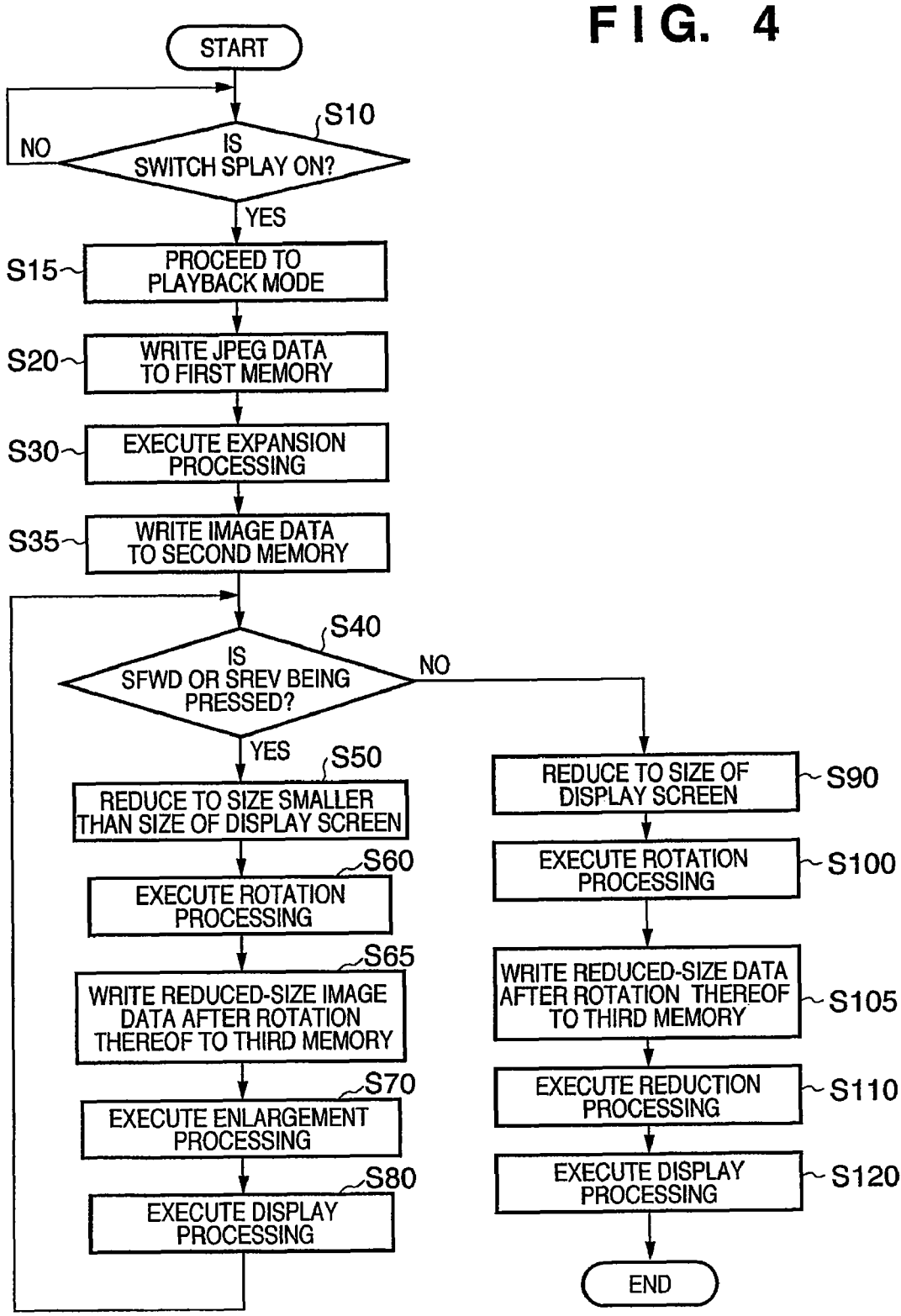
FIG. 4 is a flowchart for describing image frame-advance playback processing in the image sensing apparatus according to the first embodiment.

Reference will now be had to the flowchart of FIG. 4 to describe image frame-advance playback processing in the image sensing apparatus according to this embodiment.

This description will deal with a case where image data consisting of 3264 pixels horizontally and 2448 pixels vertically is rotated and displayed on the display unit 114 the resolution (display size) of which is 640×480 pixels, as illustrated in FIGS. 2 and 3. It should be noted that this image size is one example and will differ depending upon the type of display unit 114. For example, if the display unit is an LCD, another resolution (e.g., 720×240 pixels) may be used. Further, in a case where the display is presented on a television receiver connected externally, the number of pixels will be 704×576 with the PAL scheme and 704×480 pixels with the NTSC scheme.

At step S10 in FIG. 4, the playback mode is established if the CPU 100 discriminates that the switch SPLAY is ON (step S15). Then, at step S20, JPEG compressed data is written from the recording medium 102 to the first memory 106 via the system controller 104.

This is followed by step S30, at which the JPEG compressed data in the first memory 106 is read out and transferred by DMA to the expansion block 109 via the memory control block 105. The expansion block 109 expands the JPEG compressed data and writes the expanded data to the second memory 107 in regular order. The image data in this state has the state shown in FIG. 2A.

Next, at step S40, the CPU 100 determines whether the switch SFWD is being pressed. If the switch is being pressed, the size of the image is reduced to a size less than that of the display screen (640×480 pixels) by the reduction block 110 at step S50. Here the image is reduced to a size of 320×240 pixels. This state corresponds to FIG. 2B.

More specifically, the expanded image data that has been stored in the second memory 107 is read out and transferred by DMA to the reduction block 110 via the memory control block 105. This image data is reduced to data of 320×240 pixels, which is a size smaller than that of the display screen, by downsampling processing and interpolation processing in the reduction block 110. Here the interpolation processing in size reduction processing is used to prevent loss of necessary information due to size reduction by simple downsampling of pixels. For example, by inserting one pixel, which has been produced from the information of three contiguous pixels, in a portion that has been downsampled by these three pixels in succession, an image downsampled by two pixels can be generated while significant loss of information is suppressed.

If FIGS. 2A and 2B are compared, it will be apparent that the size reduction rate of the original image in the horizontal direction (3264 pixels to 240 pixels) is greater than the size reduction rate in the vertical direction (2448 pixels to 320 pixels). Accordingly, the reduced-size image of FIG. 2B has an aspect ratio different from that of the original image and is in a deformed state.

The reduced-size image data is sent to the rotation block 111 as is and here the data is rotated by 90° in the clockwise direction. The image data after the rotation thereof (320 pixels horizontally by 240 pixels vertically) is written to the third memory 108. The image in this state corresponds to FIG. 2C.

The data having the image size of 320×240 pixels that has been stored in the third memory 108 is supplied to the scaling block 112 via the memory control block 105 at step S70. The scaling block 112 enlarges the reduced-size image after the rotation thereof to the size of the display screen and outputs the enlarged image to the playback block 113. The latter displays the enlarged image on the display unit 114 (step S80). Control then returns to step S40 and it determined whether the switch input is continuing.

It should be noted that in the enlargement processing at step S70, the interpolation processing applied compensates for distortion of the image caused by the size reduction processing at step S50. As a result, the enlargement rate of the vertical size (240 pixels) of the reduced-size image after the rotation thereof is greater than the enlargement rate of the horizontal size (320 pixels). Consequently, if the vertical size is enlarged to, e.g., 480 pixels (a two-fold enlargement rate), the enlargement rate of the horizontal size is not doubled and the horizontal size of the enlarged image for display falls below 640 pixels. For this reason the black data 120 is displayed in the portions of screen where the image is not displayed. Thus, the resolution of the display image falls below that of the original image in the rotation and display of an image.

On the other hand, if depression of neither the switch SFWD nor the switch SREV is detected and hence it is determined that frame-advance playback has been stopped at step S40, control proceeds to step S90. Step S90 is somewhat similar to step S50 in that the image data to be displayed is read out of the second memory 107 and is subjected to size reduction processing that employs interpolation processing in the expansion block 109. However, step S90 differs in that the size after reduction is equal to the size of the display screen (640 pixels×480 pixels) (see FIG. 3B). In this case also the reduction rates in the vertical and horizontal directions differ in a manner similar to that of frame-advance playback shown in FIG. 2 and the reduced image is in a distorted state.

The reduced-size image data obtained at step S90 is rotated by 90° in the clockwise direction by the rotation block 111 at step S100 and the result is written to the third memory 108 (FIG. 3C). It should be noted that although the angle of rotation is 90° in this embodiment, the angle of rotation may be made 270°.

Next, at step S110, the image for display is generated using the scaling block 112. As mentioned above, the reduced-size image has been reduced at different reduction rates in the vertical and horizontal directions. For this reason, the image for display, from which distortion or deformation of the reduced-size image has been removed, is generated by the scaling block 112. The reduced-size image after the rotation thereof (FIG. 3C) has been reduced at a reduction rate that is higher in the vertical direction (480 pixels) than in the horizontal direction (640 pixels). Accordingly, the scaling block 112 generates the display image by performing a size reduction in such a manner that the reduction rate in the horizontal direction will be the same as that in the vertical direction. The size of the display image in the horizontal direction therefore becomes less than 640 pixels and the black data 120 is applied to the background portion that is devoid of the image.

The playback block 113 displays the display image on the display unit 114 at step S120.

This embodiment has been described solely with regard to processing for rotating and displaying images. However, when images having different orientations are been mixed on the recording medium 102 and these are played back in frame advance, the mixed images will include images (images in the landscape orientation) that do not require rotation. In such cases the rotating and display processing described above would be applied only to the images requiring rotation.

More specifically, if image data that has been read out of the second memory requires rotation, then the above-described rotation and display processing is executed. On the other hand, if the image data does not require rotation, then, regardless of whether switch SFWD or SREV is in being pressed, it will suffice to execute playback processing by reducing the size of the original image directly to the display size by the scaling block 112 and supplying the resultant image to the playback block 113.

It should be noted that whether an image is one requiring rotation or not can be determined by recording information, which indicates whether the image was shot in the vertical orientation at the time of photography, in the header, etc., of the image file and referring to this information at the time of display processing.

As mentioned above, the prior art is such that when an image is rotated and displayed, the rotation processing is always applied to an image that has been reduced to the size of the display screen (640×480 pixels in this embodiment). By contrast, this embodiment is such that during frame-advance playback (a state in which the frame-advance instruction is being applied continuously), rotation processing is applied to image data that has been reduced to a size (320×240 pixels in this embodiment) smaller than that of the display screen. Enlargement processing is executed subsequently and the image is displayed with diminished resolution on the screen. After frame-advance playback is stopped (a state in which the frame-advance command input has ceased), the image whose size has been reduced to the size of the display screen is subjected to rotation processing and is displayed.

In accordance with this embodiment, the amount of image data that undergoes rotation processing can be reduced greatly in comparison with the case where rotation processing is applied to an image whose size has been reduced to the size of the display screen (640×480 pixels in this embodiment). By way of example, in a case where rotation processing is applied to a reduced-size image of 320×240 pixels at the time of frame-advance playback, the amount of data reduction that can be achieved is equivalent to $\Delta X=[(640-320)\times(480-240)]$. In other words, as also mentioned above, rotation processing requires about four times the processing time in comparison with processing that displays an image of the same image size. In accordance with the present invention, however, the number of pixels to undergo rotation processing can be reduced to one-fourth. As a result, it is possible to execute rotation processing at high speed and frame-advance playback can be performed smoothly even in a case where images to be displayed upon being rotated are mixed with image to be displayed without being rotated.

Accordingly, high-speed viewing of images is possible while the user is applying a frame-advance instruction by pressing a fast-forward or fast-reverse button. When the user releases the button, images displayed upon being rotated can be viewed at a resolution equal to that of images displayed without being rotated. In an instance where the user is holding the fast-forward or fast-reverse button depressed, it can be construed that the user is placing more importance on viewing speed than on image resolution and therefore it is more convenient in such case to enable viewing at high speed even though there is some decline in resolution with regard to rotated images. Furthermore, after frame-advance playback is stopped, a display the resolution whereof is higher than the resolution during frame-advance playback is presented, thereby making it possible to sharply display an image that is of interest to the user who has halted successive viewing of images.

Second Embodiment

Described next will be an embodiment in which the present invention is applied to an enlarging playback function for displaying part of an original image on the display unit 114.

It should be noted that the structure of the image sensing apparatus serving as one example of an image processing apparatus according to this embodiment may just as well the same as that of the image sensing apparatus according to the first embodiment (FIG. 1) and therefore need not be described again.

FIGS. 5A to 5D are diagrams illustrating the relationship between image processing during enlarging playback and display on the display unit 114 in the image sensing apparatus according to this embodiment.

Figure 5:
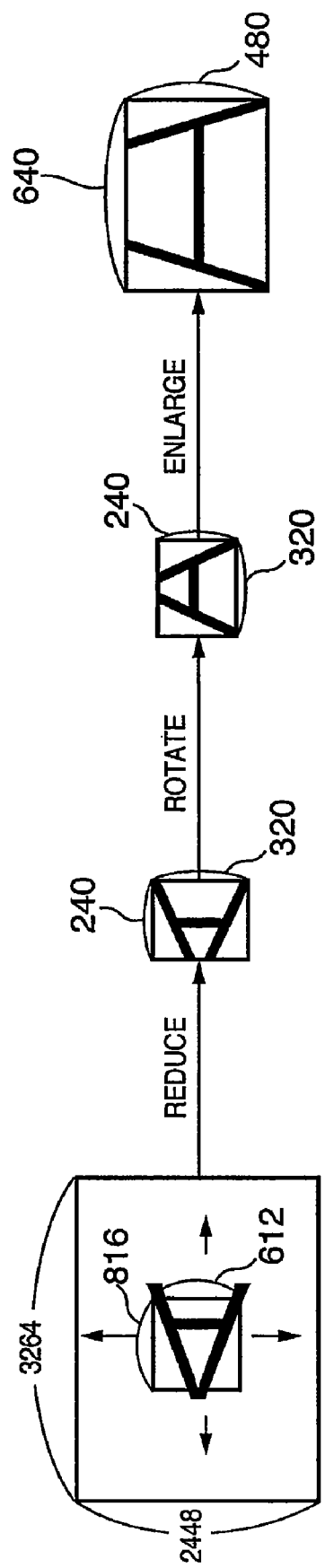
FIGS. 5A to 5D are diagrams illustrating the relationship between image processing during an enlarged scrolling display and display on a display unit in an image sensing apparatus according to a second embodiment of the present invention.

FIG. 5A illustrates original image data that has been stored in the first memory 106. FIG. 5B illustrates region image data that has been clipped for the purpose of enlarged display. FIG. 5C illustrates image data that is the result of subjecting the region image data to rotation processing. FIG. 5D illustrates display image data that has been enlarged to the size of the display screen (for a display unit compliant with the NTSC, PAL or other such standards). It should be noted that the numbers of pixels vertically and horizontally in each state are indicated in each of the drawings. The display size of the display unit 114 is assumed to be 640×480 pixels in this embodiment as well.

FIGS. 6A to 6D are diagrams illustrating the relationship between image processing in a case where a scroll instruction during enlarging playback has been discontinued or when a scroll position has been moved to an edge of an original image, and display on the display unit 114.

FIG. 6A illustrates the image data that has been stored in the first memory 106. FIG. 6B illustrates region image data that has been clipped for the purpose of enlarged display. FIG. 6C illustrates image data that is the result of subjecting the region image data to rotation processing. FIG. 6D illustrates display image data that has been enlarged to the size of the display screen (for a display unit compliant with the NTSC, PAL or other such standards). It should be noted that the numbers of pixels vertically and horizontally in each state are indicated in each of the drawings.

Figure 7:
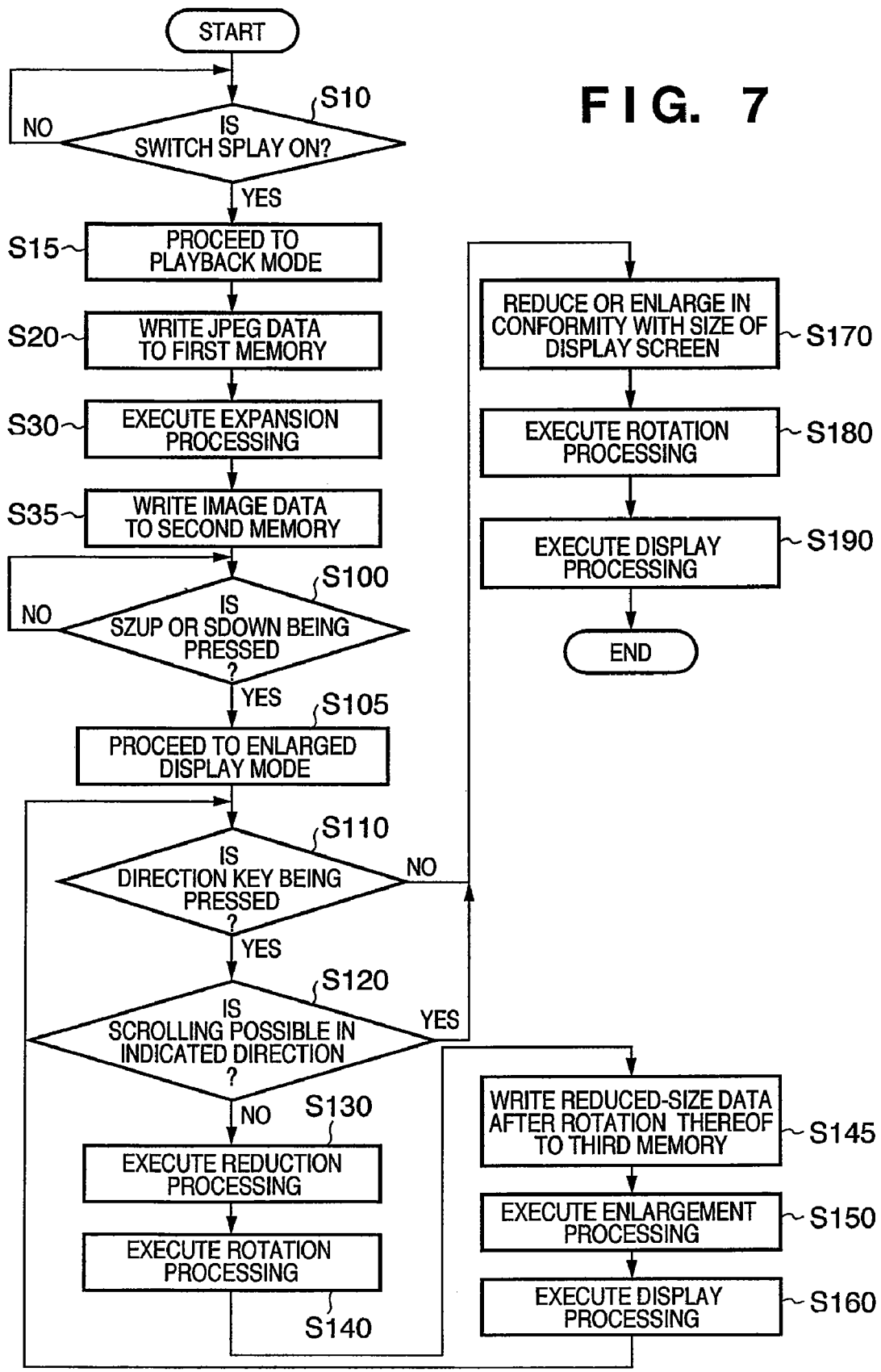
FIG. 7 is a flowchart for describing enlarged scrolling display processing in the image sensing apparatus according to the second embodiment.
Figure 8:
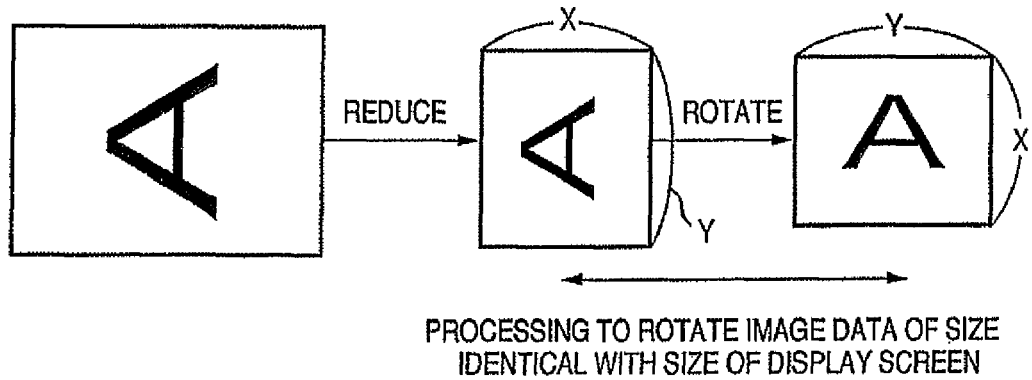
FIG. 8 is a diagram schematically illustrating a method of rotating and displaying images according to the prior art.

Reference will now be had to the flowchart of FIG. 7 to describe enlarged scrolling playback processing in the image sensing apparatus according to this embodiment.

Here it will be assumed that enlargement magnification is 4×, i.e., that an area that is one-fourth of the entire original image is displayed on the display unit 114, that the size of the original image is 3264 pixels horizontally and 2448 pixels vertically, and that the display size (resolution) of the display unit 114 is 640×480 pixels.

According to this embodiment, if an image-data scroll instruction is being input with regard to an image to be rotated and displayed and, moreover, the display area does not reach an edge of the original image, rotation processing is executed after the image has been reduced to a size smaller than that of the display size of display unit 114, then the image is enlarged and displayed. Further, if input of the image-data scroll instruction is discontinued, or if the display area has reached an edge of the original Image, rotation and display processing is executed after the image has been reduced to the display size of the display unit 114.

Steps S10 to S36 need not be described again as they are the same as those of the first embodiment. If depression of the switch SZUP or SZDOWN is discriminated at step S100, the CPU 100 causes playback processing to transition to the enlarging display mode (zoom) (step S105).

It is determined at step S110 whether any of the direction keys 116 is being pressed. If depression of any direction key 116 is sensed, it is determined at step S120 whether the clipped area can be moved in the direction indicated by the direction key, i.e., whether scrolling is possible in the indicated direction.

If scrolling is possible, the image data contained in the clipped area shifted a prescribed number of pixels in the indicated direction is reduced to a size smaller than that of the display screen (640×480 pixels) by the reduction block 110 at step S130. Here it is assumed that the size is reduced to a size of 320×240 pixels. The image data in this state corresponds to FIG. 5B.

More specifically, the expanded image data that has been stored in the second memory 107 is read out and transferred by DMA to the reduction block 110 via the memory control block 105. This image data is reduced to data of 320×240 pixels, which is a size smaller than that of the display screen, by downsampling processing and interpolation processing in the reduction block 110.

The reduced-size image data is sent to the rotation block 111 as is and here the data is rotated by 90° in the clockwise direction (step S140). The image data after the rotation thereof (320 pixels horizontally by 240 pixels vertically) is written to the third memory 108 (step S145). The image in this state corresponds to FIG. 5C.

The data having the image size of 320×240 pixels that has been stored in the third memory 108 is supplied to the scaling block 112 via the memory control block 105 at step S150. The scaling block 112 enlarges the reduced-size image after the rotation thereof by simply doubling it horizontally and vertically, thereby making it the size of the display screen. This enlarged image is output to the playback block 113 (step S150). Accordingly, the resolution of the display image falls below that of the original image in being rotated and displayed. The playback block 113 displays the enlarged image on the display unit 114 (step S160). Control then returns to step S110, where it is determined whether an input from the direction key is continuing.

Owing to the nature of processing in this embodiment, namely the enlarging and scrolling playback of part of the area of an image, enlargement processing is executed without especially compensating for distortion of the image, which is caused in the reduction processing at step S130, at the time of enlargement.

On the other hand, if depression of a direction key is no longer detected at step S110 (i.e., if scrolling has ended), then control proceeds to step S170. Further, if it is detected at step S120 that the clipped area has reached an edge of the original image and that no further scrolling can be performed in the direction indicated by the direction key, then control proceeds to step S170.

At step S170, the presently set magnification zoom setting (i.e., the size of the region image clipped) and the size of the display screen are compared and the region image is reduced or enlarged to make it conform to the size of the display screen. In this embodiment, the magnification zoom setting is made 4× and the size of the region image is 816×612 pixels. Accordingly, this is reduced to a display size of 640×480 pixels using the reduction block 110 (FIG. 6B).

The image data that has been obtained by the reduction block 110 is rotated by 90° in the clockwise direction by the rotation block 111 at step S180 (FIG. 6C) and the rotated image is written to the third memory 108 (size 640×480). It should be noted that although the angle of rotation is 90° in this embodiment, the angle of rotation may be made 270°. The image after the rotation thereof is supplied to the playback block 113 without the intermediary of the scaling block 112 and is displayed (FIG. 6D).

Further, according to this embodiment, a case where the size of the display image is 640×480 pixels, just as in the first embodiment, is described. However, the size of the display image can be changed appropriately in accordance with the display apparatus.

Figure 6:
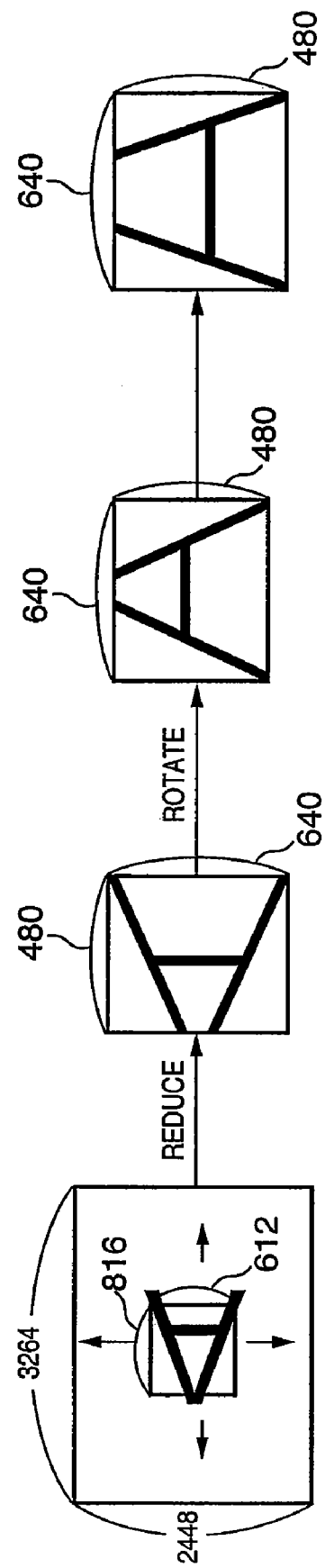
FIGS. 6A to 6D are diagrams illustrating the relationship between image processing at stopping of an enlarged scrolling display and display on a display unit in an image sensing apparatus according to the second embodiment.

Further, in a manner similar to that of the first embodiment, this embodiment also has been described with regard to enlarging and scrolling playback processing of an image that requires to be displayed upon being rotated. In case of an image that does not require rotation, it will suffice if the region image in FIG. 6 is displayed upon being reduced (or enlarged) directly to the display size without being rotated.

In accordance with this embodiment, as described above, an image requiring rotation when it is displayed in enlarged form and scrolled is reduced to a size smaller than that of the display during scrolling (i.e., in a state in which there is an input from a direction key), the reduced image is subjected to rotation processing and is thenceforth enlarged to the size of the display. As a result, display resolution declines. However, by applying rotation processing to a reduced-size image (320×240 pixels in this embodiment) smaller than the display size, the amount of data that is to undergo rotation can be reduced by an amount equivalent to $\Delta X=[(640-320)\times(480-240)]$.

In a case where scrolling is instructed, it is more convenient to be able to achieve a smoothly scrolled display even though there is some decline in resolution. In this embodiment, if there is no longer an input from a direction key and scrolling has stopped, a display in which there is no decline in resolution is presented. This makes it possible to provide a sharp still image. Thus, by presenting a display in which display speed is emphasized during scrolled playback and resolution is emphasized when strolling stops, ease of use can be improved.

Other Embodiments

The foregoing embodiments relate to a case where the present invention is applied to, e.g., processing executed when image data that has been stored in advance as in the manner of an already shot image is read out and displayed. However, the principle of the present invention, namely that image data for display purposes is generated by subjecting a reduced image, the size of which is smaller than that of the display, to rotation processing at the time of rotation and display and then enlarging the rotated image to the display size, can also be applied to other display processing as well.

For example, the present invention may be applied to quick-review processing (processing that displays results of photography immediately after a picture is taken) in an image sensing apparatus that is capable of detecting orientation (vertical or horizontal) at the time of photography. In this case, if photography in the vertical orientation (or horizontal orientation) has been sensed by an orientation sensor provided in the image sensing apparatus, data rotated and displayed at the time of quick review can be generated in a manner similar to that of the foregoing embodiments.

Thus, the present invention is not limited to cases where it is necessary to execute rotation and display processing continuously, as at the time of frame-advance playback or scrolled-display feedback, and the invention is applicable to any display processing as a method capable of implementing rotation and display processing at high speed or low processing load.

It should be noted that the present invention also covers a case where a computer program for implementing the functions of the above embodiments is executed by a system that includes a computer or by a computer of an apparatus, whereby equivalent functions are achieved. The program may be supplied to the system that includes the computer or to the computer directly from a recording medium or through use of wired/wireless communication.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of recording media by which the program can be supplied are magnetic recording media such as flexible disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, a data file (program-data file) that can serve as a computer program for forming the present invention in a client computer is stored in the server of a computer network and the computer-data file is downloaded to the client computer that has been connected. In such case the program-data file can be divided into a plurality of segment files and the segment files can be deployed at different servers. An example of the program-data file is the computer program that forms the invention or a compressed file having an automatic install function.

In other words, the present invention also covers a server apparatus that allows multiple users to download a program-data file for the purpose of implementing the functions of the present invention by computer.

Further, it is also possible to encrypt and store the program of the present invention on a storage medium such as a CD-ROM, distribute the storage medium to users and allow users who meet certain requirements to download decryption key information via the Internet, by way of example. In this case these users can be allowed to run the encrypted program by using the key information, whereby the program is installed in the user computer.

Furthermore, besides the case where the aforesaid functions according to the embodiments are implemented by executing the read program by computer, the functions of the embodiments may be implemented by utilizing another program. For example, an operating system or the like running on the computer can perform all or a part of the actual processing based upon commands in the program so that the functions of the foregoing embodiments are be implemented by this processing.

Furthermore, the functions of the foregoing embodiments may be implemented by executing a program, which has been read out of a recording medium, by a function expansion board that has been inserted into the computer or by a function expansion unit that has been connected to the computer. More specifically, the program may be executed by a memory and CPU provided on a function expansion board or function expansion unit and all or part of the actual processing may be thus handled.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-040896, filed Feb. 17, 2005, which is hereby incorporated by reference herein in its entirety.

What is claimed is:

1. An image processing apparatus for generating display image data having a predetermined size from image data, comprising:
   a detecting unit constructed to detect an instruction to change over the image data;
   a reducing unit constructed to generate a reduced-size image of the image data;
   a rotating unit constructed to generate a rotated image obtained by rotating the reduced-size image;
   an enlarging unit constructed to enlarge the rotated image to the predetermined size; and
   a control unit comprising a processor constructed to, if the instruction to change over the image data has been detected, cause a reduced-size image having a size smaller than the predetermined size to be generated by said reducing unit, and constructed to, if the instruction to change over the image data has not been detected, cause a reduced-size image having the predetermined size to be generated by said reducing unit and an output from said enlarging unit to be delivered as the display image data.

2. The apparatus according to claim 1, further comprising a determination unit constructed to determine whether the image data represents an image that requires rotation,
   wherein with regard to image data that does not require rotation, said control unit causes an image, which has been obtained by reducing the image data to the predetermined size by said reducing unit, to be output as the display image data.

3. The apparatus according to claim 1, wherein said reducing unit generates the reduced-size image by applying size reduction rates that differ in horizontal and vertical directions of the image data, and
   wherein said enlarging unit executes enlargement processing so as to compensate for a disparity in the size reduction rates in the horizontal and vertical directions when the reduced-size image is generated, and causes pixels of a predetermined color to be included in an area which does not fill the predetermined size of the image data after the enlargement processing thereof, thereby generating image data having the predetermined size.

4. The apparatus according to claim 1, wherein said reducing unit generates the reduced-size image from a region image that corresponds to a region designated in the image data.

5. An image sensing apparatus comprising:
   the image processing apparatus set forth in claim 1;
   a display unit, and
   a supply unit constructed to supply the image data to said image processing apparatus,
   wherein display image data generated by said image processing apparatus is displayed by said display unit.

6. An image processing method for generating display image data having a predetermined size from image data, comprising:
   using a processor to perform:
   a detecting step of detecting an instruction to change over the image data;
   a reducing step of generating a reduced-size image of the image data;
   a rotating step of generating a rotated image obtained by rotating the reduced-size image;
   an enlarging step of enlarging the rotated image to the predetermined size; and
   a control step of causing a reduced-size image having a size smaller than the predetermined size to be generated by said reducing step if the instruction to change over the image data has been detected, and causing a reduced-size image having the predetermined size to be generated by said reducing step and causing an output from said enlarging step to be delivered as the display image data if the instruction to change over the image data has not been detected.

7. A control program for causing a computer to execute the steps included in the image processing method set forth in claim 6.

8. A non-transitory computer-readable medium recording medium storing the control program set forth in claim 7.

* * * * *